A. HARNISHFEGER.
HOLDER.
APPLICATION FILED AUG. 6, 1913.
1,095,856.
Patented May 5, 1914.
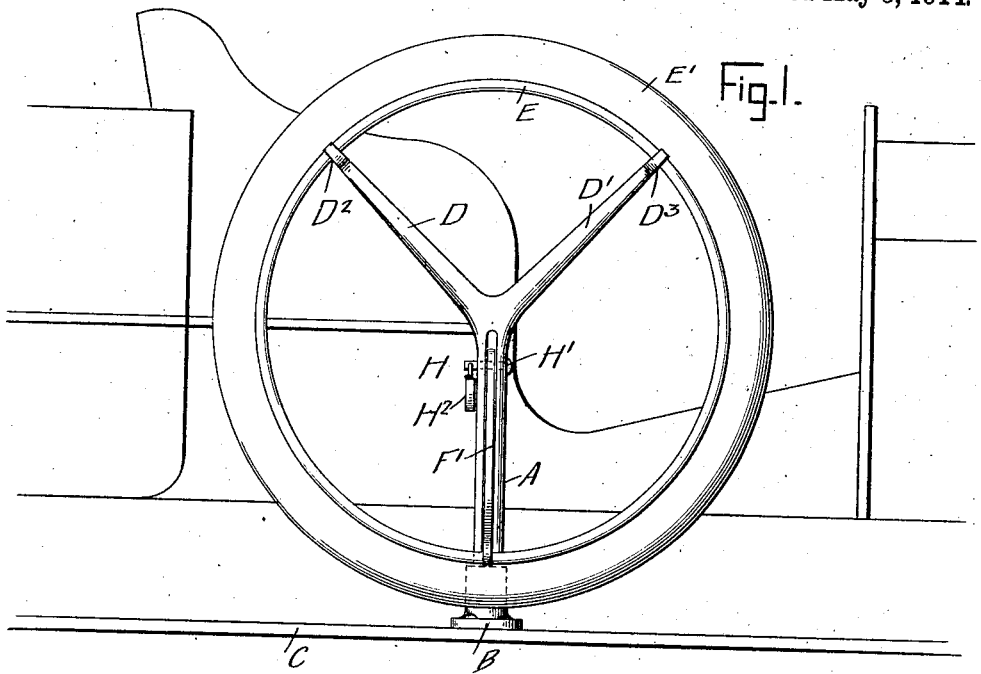
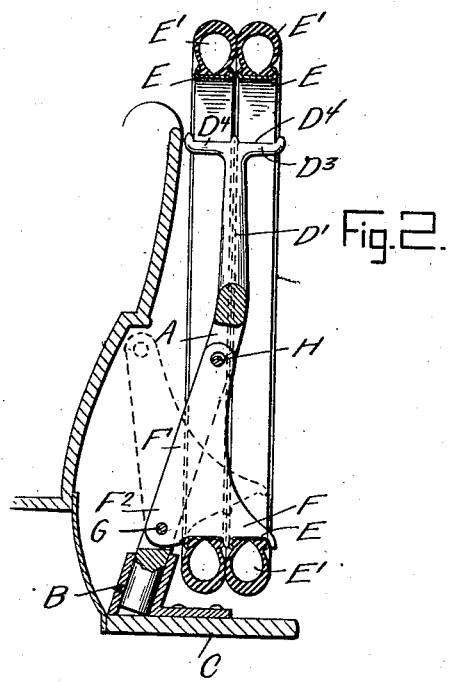
WITNESSES
INVENTOR
ALEXANDER HARNISHFEGER
BY
ATTORNEYS

UNITED STATES PATENT OFFICE.

ALEXANDER HARNISHFEGER, OF EVANSVILLE, INDIANA, ASSIGNOR OF SEVEN-SIXTEENTHS TO HIMSELF, SEVEN-SIXTEENTHS TO MOSES A. STROUSE, AND TWO-SIXTEENTHS TO WILLIAM N. ERSKINE, ALL OF EVANSVILLE, INDIANA.

HOLDER.

1,095,856. Specification of Letters Patent. Patented May 5, 1914.

Application filed August 6, 1913. Serial No. 783,289.

*To all whom it may concern:*

Be it known that I, ALEXANDER HARNISHFEGER, a citizen of the United States, and a resident of Evansville, in the county of Vanderburg and State of Indiana, have invented a new and Improved Holder, of which the following is a full, clear, and exact description.

The invention relates to tire support, such as shown and described in the Letters Patent of the United States, No. 1,062,462, granted to me on May 20, 1913.

The object of the present invention is to provide a new and improved holder or support for use on the side or rear of an automobile for safely carrying one or more extra tires, each held on the demountable rim, or for carrying wheels or other circular articles, the holder being arranged to take up very little room, to prevent the articles from being removed by unauthorized persons, and to allow of quickly removing an article from the holder for use whenever needed.

In order to accomplish the desired result use is made of a bracket provided with fixed transverse supporting members spaced apart and adapted to engage the inner face of the circular article to support the latter, a locking member pivoted on the said bracket and adapted to engage the rim at a point intermediate the said supporting members, and means for locking the said locking member in locking position.

A practical embodiment of the invention is represented in the accompanying drawings forming a part of this specification, in which similar characters of reference indicate corresponding parts in both views.

Figure 1 is a side elevation of the holder as applied to the running board of an automobile, for supporting two tires held on demountable rims; and Fig. 2 is a transverse section of the same.

The bracket or frame A of the holder is provided with a base B secured to the running board C or other suitable part of an automobile on which the holder is to be used. The upper end of the vertically-disposed bracket A is provided with diverging arms D, D' provided at their free ends with transversely-extending seats D², D³ adapted to be engaged by the demountable rims E each carrying an inflatable tire E'. Each seat D², D³ is provided with recesses D⁴ for the rims E to fit in, so as to separately hold the rims and their tires. It will be noticed that by the arrangement described the article to be supported can be readily hung in position on the seats D², D³ so as to support the article.

In order to lock the article in place, use is made of a locking seat F held on a locking member F' provided at its lower rear end with a heel F² connected by a pivot pin G with the bracket A at the base B. The upper free end of the arm F' is adapted to be locked to the bracket A by the use of a suitable locking device H. The locking device H shown in the drawings consists of a pin H' extending through openings in the bracket A and the free end of the arm F', and on the outer end of the pin H' is removably held a padlock H² which when closed prevents removal of the pin H' from the bracket A and the arm F'. When it is desired to place an article on the holder or support or to remove an article therefrom the lock H is removed to permit of swinging the arm F' rearwardly into the position shown in dotted lines in Fig. 2, to move the seat F out of engagement with the article, thus unlocking the same. The article can now be lifted off the supporting seats D², D³, or an article may be placed in position on the said seats, and then the arm F' is swung forward to engage the seat F with the bottom of the article and the lock H is replaced to lock the arm F' in locking position. It is understood that when the arm F' is swung forward the seat F bears down on the article to firmly hold the same in position on the seats D², D³ to prevent rattling of the supported article.

The holder shown and described is very simple and durable in construction, can be cheaply manufactured and readily applied to any automobile or other vehicle.

Having thus described my invention, I claim as new and desire to secure by Letters Patent:

1. A support of the class described, comprising a bracket provided with fixed transverse supporting members spaced apart and adapted to engage the inner face of the circular article to support the latter, and a locking member pivoted on the said bracket to swing in the direction of the length of the bracket and radially of the circular article to engage the latter at a point intermediate the said supporting members, and means for locking the said locking member in locked position.

2. A support of the class described, comprising a bracket having a body and diverging arms at one end of the body terminating in transverse supporting members adapted to engage the article to be supported, and a locking arm having a transverse member adapted to engage the article, the said locking arm being pivoted at the opposite end of the body to swing in the direction of the length of the latter, and means for locking the said locking member in place on the bracket.

3. A support of the class described, comprising a bracket having diverging upper arms terminating in transverse supporting members adapted to support the article to be supported, a locking arm having a transverse member adapted to engage the article at the lower end thereof, the said locking arm having a rearwardly-extending heel at its lower end, the heel being pivoted on the said bracket, and means for locking the upper free end of the said locking arm to the said bracket.

4. A support of the class described, comprising a bracket having a body and diverging arms at one end of the body terminating in transverse, supporting members adapted to engage the article to be supported, and a locking arm having a transverse member also adapted to engage the article, the said locking arm being pivoted on the bracket at the opposite end of the body to swing in the direction of the length of the latter to and from engaged position, said bracket body and said locking arm being provided with transverse apertures adapted to aline with the latter when in engaged position, for the purpose described.

5. A support of the class described, comprising a bracket having diverging arms at its upper end provided with rim-engaging members and having a lower angular body portion provided with a longitudinal slot, and with apertures therethrough adjacent the upper end of the slot and a locking arm having a rim-engaging portion at its lower end and a rearwardly projecting heel at its lower end pivoted in the slot of the bracket body, the upper end of said locking arm having an aperture to aline with the apertures of the bracket body when the arm is in engaged position, all for the purpose described.

6. A support of the class described, comprising a rim-engaging bracket having a body portion longitudinally slotted adjacent one end and provided with arms diverging from its opposite end and a rim-engaging locking arm pivoted and movable within the slot of the body, substantially as described.

In testimony whereof I have signed my name to this specification in the presence of two subscribing witnesses.

ALEXANDER HARNISHFEGER.

Witnesses:
A. L. HOELSCHER,
A. A. ROLLER.